（12）United States Patent
Gwyther

(10) Patent No.: US 7,722,448 B2
(45) Date of Patent: May 25, 2010

(54) DEHIDER WITH GOVERNOR AND STRENGTHENED BLADE

(75) Inventor: Peter Gwyther, Madison, CT (US)

(73) Assignee: Jarvis Products Corporation, Middletown, CT (US)

( * ) Notice: Subject to any disclaimer, the term of this patent is extended or adjusted under 35 U.S.C. 154(b) by 793 days.

(21) Appl. No.: 11/464,991

(22) Filed: Aug. 16, 2006

(65) Prior Publication Data

US 2008/0045130 A1 Feb. 21, 2008

(51) Int. Cl.
*A22B 5/16* (2006.01)
(52) U.S. Cl. .................................................... 452/133
(58) Field of Classification Search .................. 452/125, 452/132, 133, 135, 137, 164; 30/205, 206, 30/215–222, 224, 276, 347, 286, 388, 389, 30/390, 355, 351, 371, 372
See application file for complete search history.

(56) References Cited

U.S. PATENT DOCUMENTS

| | | | | |
|---|---|---|---|---|
| 3,857,177 A | * | 12/1974 | Karubian et al. | 30/216 |
| 4,215,451 A | * | 8/1980 | Wikoff | 452/133 |
| 5,122,092 A | | 6/1992 | Abdul | |
| 5,311,664 A | | 5/1994 | Abdul | |
| 7,163,453 B1 | * | 1/2007 | Gwyther | 452/132 |

OTHER PUBLICATIONS

Jarvis Products Corporation, Jarvis Model JC 111A Air Powered Dehider, Maintenance Instruction booklet, pp. 1-12.
Atlas Copco Tools AB, Die Grinder LSF 27S150-2, Operator's Instructions booklet, 8 pages.

* cited by examiner

*Primary Examiner*—Thomas Price
(74) *Attorney, Agent, or Firm*—DeLio & Peterson, LLC

(57) ABSTRACT

A dehider includes a pneumatic motor driving a pair of disk blades in opposed cutting oscillations and a governor that controls the speed of the motor. Governor balls, acting as centrifugal weights, spin with the motor and push against an inclined flange on a valve head to move the valve head towards a valve seat. The motion of the valve head compresses a biasing spring and restricts the flow of pressurized air as the desired speed is exceeded. As speed decreases, centrifugal force decreases and the biasing spring opens the valve to provide additional power to the motor. The disk blades are provided with a cylindrical central lip that substantially increases the area of the central bearing that the blades turn on and produces significantly longer blade life.

19 Claims, 6 Drawing Sheets

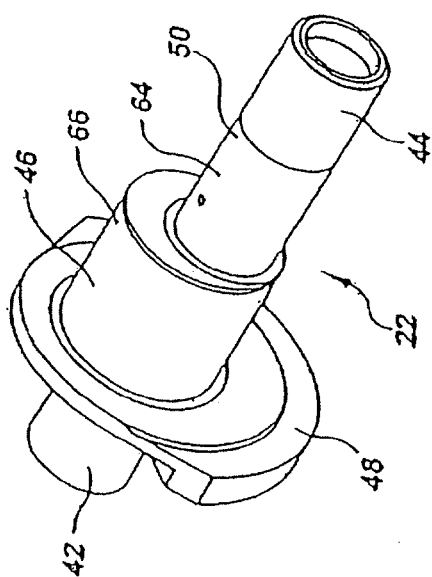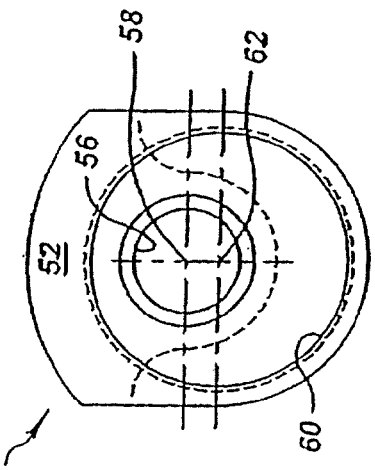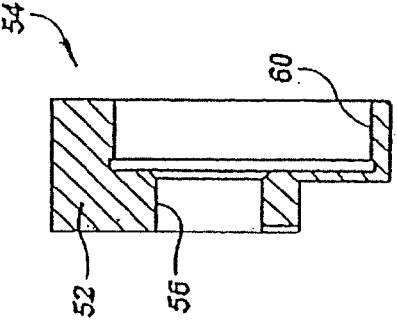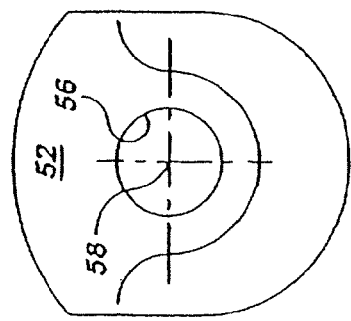

DEHIDER WITH GOVERNOR AND STRENGTHENED BLADE

BACKGROUND OF THE INVENTION

1. Field of the Invention

The present invention relates to handheld dehiders and powered skinning knives used to remove the hide of a carcass in a meat processing facility. More specifically, the present invention relates to dehiders that use a pair of cutting disks driven in opposed cutting oscillations.

2. Description of Related Art

Handheld dehiders are used in meat processing facilities to remove the hide from an animal carcass. The most common type of dehider includes a pair of adjacent cutting disks or blades that are driven in opposed cutting oscillations by a corresponding pair of pushrods. The basic design is shown in U.S. Pat. No. 5,122,092 assigned to Jarvis Products Corporation, the assignee of the present invention. Similar dehider designs are shown and described in U.S. Pat. Nos. 4,368,560, 3,435,522 and 2,751,680.

In the dehider design described in the patents above, each cutting blade includes teeth around its perimeter. The adjacent disk blades are driven in opposed cutting oscillations by a pair of pushrods connected to an eccentric drive mechanism operated by a pneumatic motor mounted in the handle of the tool.

The motor rotates a pinion gear, which turns a main drive gear oriented at ninety degrees to the axis of the motor. The main drive gear turns the eccentric shaft to oscillate the pushrods. During each oscillation, the teeth on one disk blade move past the teeth on the adjacent and oppositely moving disk blade. This produces a shearing and cutting action that quickly removes the hide from the carcass.

Although this dehider design has proven effective, existing designs tend to slow down under a heavy cutting load and then return to a higher speed as the cutting load is removed. To achieve the optimum cutting speed while operating under load, dehiders of this type must be set to run at a higher speed when they are not cutting. This higher no-load speed produces undesirable increases in tool wear and noise. The excess speed under the no-load condition is particularly problematical for a dehider having oscillating blades due to the frequent forward and back reversals of the blades and pushrods and the wear associated with the oscillating motion at high speed.

Another problem in existing designs lies in the design of the oscillating disk blades. These blades have heretofore been constructed with a constant thickness at all locations—except at the cutting edges where the thickness decreases to form the sharpened blade edges and teeth. In particular, the inner bearing area of the cutting disk has been of the same thickness as the outer portions of the blade. Each blade rotates about a bearing formed by a hole in this inner bearing area.

The limited thickness of the blade is advantageous at the outer edges of the blade, but it limits the bearing surface area at the center. The limited size of the bearing center hole produces wear at a greater rate than is desirable. As the blade wears, the center hole enlarges until the blade eventually becomes unusable. Often, it is this center bearing wear that limits the useful life of the blade. If not for this excess bearing wear, the blade could be sharpened additionally and the useful life of the blade extended.

Still another problem lies in the oscillating nature of the eccentric-driven pushrods and blades, which produces substantial vibration. A known method of reducing this vibration is to use a counterbalance mass on the main drive gear, however, this solution is only partly effective. In order to avoid interference with the oscillating pushrods, the main drive gear and any counterbalance mass connected thereto must be vertically offset from the plane of the pushrods. The offset between the moving mass of the pushrods and the oppositely moving mass of the counterbalance on the main drive gear produces a wobbling motion.

Initially, the magnitude of this wobbling motion is quite limited and the tool can be used comfortably for long periods of time. However, over time, the wobbling motion produces significant excess wear. As the bearings and moving parts begin to wear, the wobble increases in amplitude until it produces an extremely objectionable vibration. Moreover, the wear produced by this motion shortens the lifetime of the component parts in the tool.

Bearing in mind the problems and deficiencies of the prior art, it is therefore an object of the present invention to provide a handheld dehider that operates at a nearly constant speed when operating under a load and when operating without a load.

Yet another object of the present invention is to provide a handheld dehider with blades that wear at the center bearing more slowly than existing designs.

A further object of the present invention is to provide a handheld dehider with less vibration that can be comfortably used for long periods of time.

It is another object of the present invention to provide a handheld dehider that wears less rapidly due to reduced vibration.

Still another object of the invention is to provide a counterbalanced eccentric shaft for a handheld dehider with an integrated counterbalance mass.

It is yet another object of the present invention to provide a counterbalance cup for a handheld dehider with an integrated counterbalance mass.

Still other objects and advantages of the invention will in part be obvious and will in part be apparent from the specification.

SUMMARY OF THE INVENTION

The above and other objects, which will be apparent to those skilled in the art, are achieved in the present invention which is directed to a handheld dehider having a pair of cutting disks mounted on a cutting disk shaft, and a drive mechanism for driving the cutting disks in opposed cutting oscillations. The drive mechanism includes an eccentric shaft and a pair of pushrods, one for each cutting disk, each pushrod being connected between the eccentric shaft and its respective cutting disk. A pneumatic motor mounted in a housing is connected to turn the eccentric shaft and oscillate the pair of pushrods. The housing includes an air inlet for providing a flow of pressurized air to the motor, and a speed governor connected between the air inlet and the motor, the speed governor automatically controlling the flow of pressurized air from the air inlet to the pneumatic motor to maintain a desired rotational speed for the motor.

In one aspect of the invention, the speed governor is connected to spin with the pneumatic motor and operates by centrifugal force to restrict the flow of pressurized air from the air inlet to the pneumatic motor to decrease the speed of the motor when the motor speed is above the desired rotational speed.

In the preferred embodiment, the speed governor includes a valve head connected to spin with the pneumatic motor and the air inlet is connected to a valve seat. The valve head moves towards the valve seat to restrict the flow of pressurized air from the air inlet to the pneumatic motor and decrease the speed of the motor when the motor speed is above the desired rotational speed.

In another aspect of the invention, the speed governor includes a governor spring biasing the valve head away from the valve seat and a movable mass connected to spin with the pneumatic motor. The movable mass moves outward as the speed governor spins and compresses the governor spring to move the valve head towards the valve seat and restrict the flow of pressurized air from the air inlet to the pneumatic motor.

The movable mass is preferably one or more governor balls that contact an angled flange on the valve head. As the balls spin, they exert centrifugal force against the angled flange to compress the governor spring and move the valve head towards the valve seat.

In another aspect of the dehider design, the housing includes a drive mechanism cover having three pieces. A drive mechanism cover portion is located over the drive gear. A barrier plate portion is located under the pushrods and wall portion connects the drive mechanism cover portion to the barrier plate portion. The drive mechanism cover is preferably an integral piece made of steel.

In still another preferred aspect of the dehider design, each cutting disk includes a central opening and a bearing lip surrounding the central opening. The central openings and bearing lips of the pair of cutting disks form a bearing having an enlarged bearing surface that surrounds the cutting disk shaft. The cutting disk shaft may include a cylindrical collar having an outer bearing surface that the central opening and bearing lip of each cutting disk surrounds. The central openings and bearing lips of the pair of cutting disks cooperate to form a bearing having an inner bearing surface that contacts the outer bearing surface of the cylindrical collar.

In yet another aspect of the handheld dehider design, the dehider housing includes a first cover adjacent a first one of the pair of cutting disks and a second cover adjacent a second one of the pair of cutting disks. The first cover has a recess for receiving the bearing lip of the first one of the pair of cutting disks and the second cover has another recess for receiving the bearing lip of the second one of the pair of cutting disks. The cylindrical collar may also be received in the recesses of the first and second covers.

The bearing lip surrounding the central opening of each cutting disk preferably projects outwardly from only one side of each cutting disk so that the pair of disks may be assembled back to back without interference between their respective bearing lips.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 is a perspective view of an eccentric with an integrated first counterbalance according to the present invention as seen in FIGS. 1 and 2.

FIG. 4 is a top plan view of a second counterbalance according to the present invention as seen in FIGS. 1 and 2.

FIG. 5 is a bottom plan view of the second counterbalance seen in FIG. 4.

FIG. 6 is a side elevational view of the second counterbalance seen in FIG. 4.

DESCRIPTION OF THE PREFERRED EMBODIMENT(S)

In describing the preferred embodiment of the present invention, reference will be made herein to FIGS. 1-10 of the drawings in which like numerals refer to like features of the invention.

Figures 1, 2:
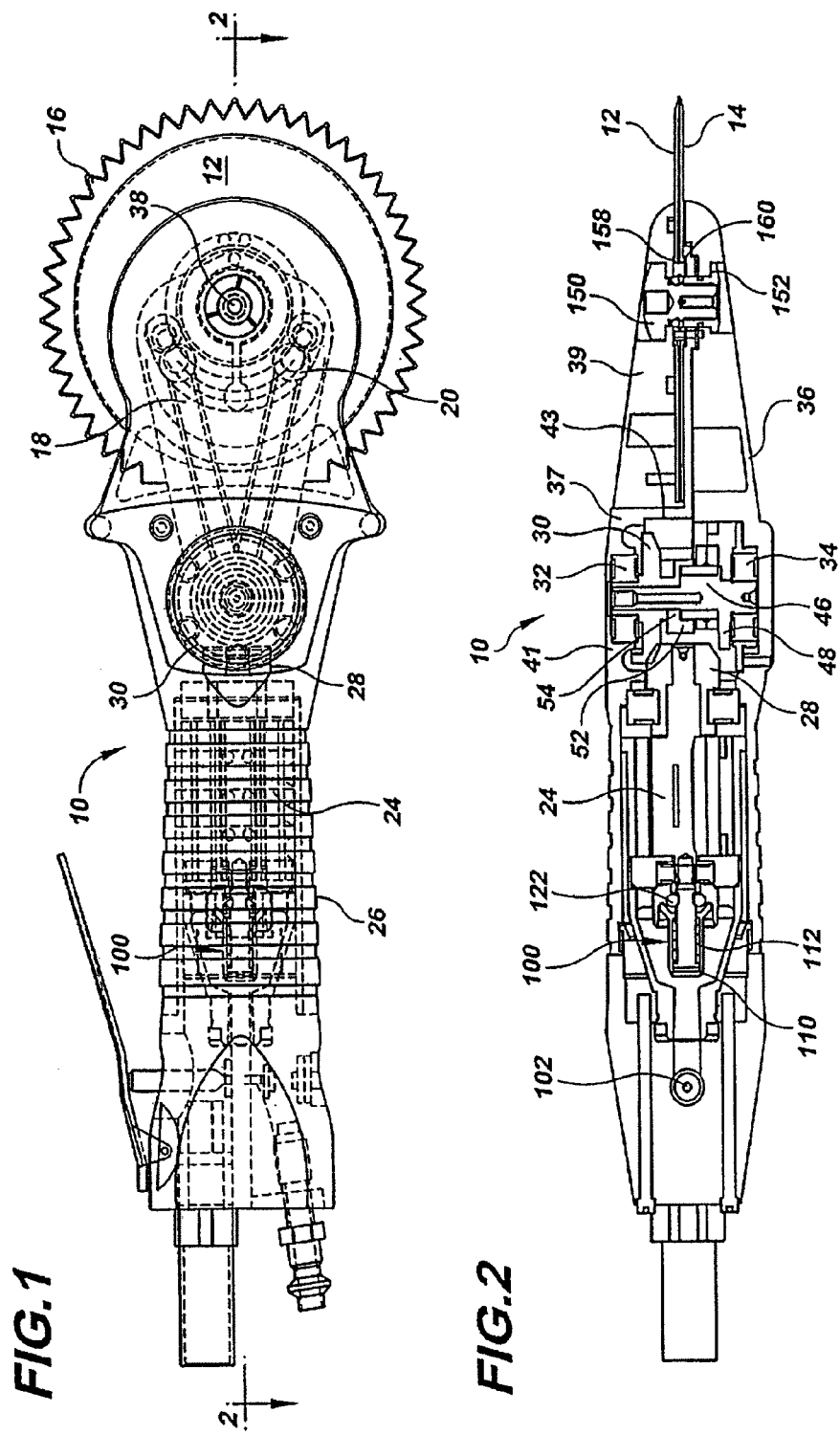
FIG. 1 is a top plan view of a first embodiment of a dehider according to the present invention.
FIG. 2 is a right side elevational view of the first embodiment of the dehider of the present invention, taken in cross section along the line 2-2 in FIG. 1.

FIGS. 1 and 2 show a handheld dehider 10 according to a first embodiment of the present invention. The dehider 10 includes a pair of adjacent cutting disks 12 and 14 having teeth 16 located around the perimeter of each disk. The cutting disks 12, 14 are driven by a pair of pushrods 18, 20 in opposed cutting oscillations by an eccentric shaft 22 (seen best in FIG. 3).

The eccentric shaft 22 is driven by pneumatic motor 24 located in the handle 26 of the tool housing. The motor 24 drives pinion gear 28, which engages and turns the main drive gear 30. The main drive gear 30 is mounted on the eccentric shaft 22 such that rotation of the motor and pinion gear turns the main drive gear and eccentric shaft to drive the pushrods and cutting disks.

The eccentric shaft 22 is held between a pair of bearings 32, 34 mounted in the housing 36 of the dehider. The housing includes the handle 26 at the back of the tool and a forward end of the tool that wraps around and below the drive area and extends underneath the cutting disks. The housing also includes a drive mechanism cover 37 that extends over the drive area and immediately below the cutting disks, and a blade cover 39 located above the cutting disks. The housing design allows easy cleaning and removal of the drive mechanism without removing the motor.

The drive mechanism cover 37 includes three pieces including a drive mechanism cover portion 41, a barrier plate portion 45 and wall portion 43 that connects the other two pieces. The drive mechanism cover portion 41 covers the top of the gear assembly and provides access thereto. The barrier plate 45 passes underneath the cutting disks and separates them from the pushrods. The wall portion 43 connects the other two pieces and further isolates the drive mechanism from the cutting disks.

These three pieces cooperate to substantially seal the drive mechanism inside the tool and separate the drive mechanism and pushrods from the cutting disks 12, 14. The cutting disks 12, 14 are located on one side of the barrier plate, in contact with the flat portion thereof. The barrier plate 45 serves not only as a barrier against the entry of contaminating material, but also as a flat bearing surface against which the cutting disk 14 slides. This large flat bearing surface stabilizes the cutting disks and prevents them from twisting during use. Accordingly, to minimize wear, the barrier plate is preferably made of a harder material than the remainder of the housing. Prior art designs which incorporated the barrier plate into the housing were required to make the housing and the barrier plate of the same material. As a result, additional processing steps were required to properly harden the face of the barrier plate and prevent undue wear.

In the present invention, both the drive mechanism cover portion and the barrier portion are preferably made of steel. Moreover, the steel forms an excellent material for receiving the bearing 32, and in the event bearing 32 locks up, the damage caused will be less than if the drive mechanism cover were manufactured of aluminum. If the damage is excessive, the drive mechanism cover may easily be replaced.

The main drive gear 30 has inwardly facing teeth and is driven by the motor 24 through the pinion gear 28. Because the main drive gear is mounted on the same side of the pinion gear as the drive mechanism cover, the complete drive mechanism may be removed from the housing merely by removing the drive mechanism cover.

The pushrods 18, 20 are driven by the eccentric shaft such that the back ends of the pushrods are concentrically engaged by the eccentric shaft and move in a circle as the eccentric shaft turns. The front ends of the pushrods move forwards and backwards approximately parallel to the axis of the dehider tool. The moving front ends are connected to the cutting disks 12, 14, through the barrier plate, with one pushrod to each disk.

Each pushrod extends to an opposite side of the cutting disk shaft 38 and connects to its associated cutting disk on its respective side of the cutting disk shaft. As each pushrod moves forward, it turns the cutting disk it is connected to in the opposite direction from the cutting disk being driven by the other pushrod on the opposite side of the cutting disk shaft 38. This produces the opposed cutting disk oscillations of this tool.

During each cutting oscillation the teeth 16 on cutting disk 12 pass by the oppositely moving teeth on adjacent cutting disk 14. As the eccentric shaft continues to rotate, the pushrods 18, 20 are drawn back and the direction of motion of the cutting disks 12, 14 is reversed. This causes the cutting teeth 16 on one cutting disk to again pass by the oppositely moving teeth on the other cutting disk to produce a scissors-like action between the oppositely moving teeth that quickly and effectively allows the dehider operator to remove the hide of the carcass.

A more detailed description of operation and the advantages of the housing design can be found in U.S. Pat. No. 5,122,092, assigned to Jarvis Products Corporation, the assignee of the present invention, the disclosure of which is incorporated herein by reference.

From the description above, it will be understood that all hand-held dehiders of this basic design are subject to a vibration resulting from the oscillating mass of the pushrods and cutting disks being driven by the eccentric drive system. During each rotation of the eccentric shaft, the two pushrods are driven forward and back, and the disk blades are accelerated in a first direction, then stopped and accelerated in the opposite direction.

A known method of reducing this vibration is to provide a counterbalance mass on the main drive gear 30. The counterbalance mass on the main drive gear (which is located in the drive section near the top of the tool in FIG. 2) is arranged so that it is moving back (towards the handle of the tool) as the eccentric portion of the eccentric shaft (located in the drive section near the bottom of the tool in FIG. 2) is moving the two pushrods forward (towards the cutting disks on the working end of the tool).

The principal difficulty with this method of vibration reduction resides in the fact that it does not provide true dynamic counterbalancing for the dehider. To provide clearance for the pushrods, and to allow the drive mechanism to be removed without removing the motor, the main drive gear must be located above the axis of the motor—in a plane that is well above the plane of the oscillating mass of the pushrods. Consequently, as the pushrods are being driven forward by the eccentric shaft, there is a backwards reaction force that is applied low in the drive section of the tool (where the eccentric shaft and pushrods are located). Simultaneously, the counterbalance mass on the main drive gear is moving backwards, but this produces a forward reaction force that is applied high in the drive section of the tool, where the main drive gear must be located.

Although the forces produced by the counterbalance and the moving masses are in the opposite direction, because they are not aligned in the same plane, they do not cancel completely. The force low in the tool's drive section from the moving masses and the force high in the drive section produce a reinforcing torque on the tool that reverses direction with each oscillation of the cutting disks. The result is that in prior art tools, even tools with drive gear counterbalancing, the tool is not dynamically counterbalanced and a wobbling motion is imparted that produces significant wear on the tool's drive components.

Initially the wobbling motion is relatively small, but as the bearings and pushrods begin to wear, the level of vibration and the wobbling motion increases rapidly to objectionable levels. The present invention addresses this problem by providing two counterbalance masses located on opposite sides of the plane of the pushrods. The two counterbalance masses cooperate to provide counterbalancing which acts at a location between the counterbalance masses and directly opposite and in the same plane as the oscillating mass of the pushrods.

In the preferred embodiment of this invention, the counterbalance mass above the plane of the pushrods is removed from the main drive gear and is shifted onto a separate counterbalance cup 54 (see FIGS. 4-6) that also acts as a spacer. By removing the counterbalance mass from the main drive gear, it can be moved closer to the plane of the pushrods, which reduces the torque produced and the resulting wobbling motion. In addition, the cost of manufacturing the complex main drive gear is substantially reduced.

FIG. 3 shows an eccentric shaft according to the present invention used in the preferred dehider design of FIGS. 1 and 2. The eccentric shaft 22 includes first and second cylindrical shaft sections 42, 44 which fit into bearings 34 and 32, respectively. The eccentric shaft portion 46 is centrally located and cylindrical bearings on the rear ends of the pushrods fit onto the eccentric shaft portion 46. Adjacent to the eccentric shaft portion 46 is a first counterbalance mass 48. It will be noted that the first counterbalance mass 48 is substantially on the opposite side of the shaft 22 from the eccentric shaft portion 46. Thus, when the pushrods are moving toward the front of the tool in FIGS. 1 and 2, the counterbalance mass 48 will be moving toward the back of the tool.

It will also be seen that the counterbalance mass 48 is extremely close to the eccentric shaft section 46. Accordingly, even without the second counterbalance mass on the counterbalance cup 54, the location of the first counterbalance mass 48 close to the plane of the pushrods improves counterbalancing as compared to the offset location of the prior art on the main drive gear.

The main gear 30 is mounted on the eccentric shaft 22 on a gear shaft portion 50 adjacent to the bearing shaft portion 44.

In order to provide true dynamic counterbalancing, the counterbalancing mass should be located directly opposite the eccentric shaft approximately in the plane of the pushrods 18, 20. However, this location would produce interference between the counterbalance mass and the pushrods as the pushrods move to the rear of the tool and the counterbalance mass must move to the front of the tool. Accordingly, a second counterbalance mass 52 is located on the opposite side of the eccentric shaft and the pushrods from the first counterbalance mass 48 such that the effective counterbalancing mass acts at a point between the first and second counterbalancing masses.

In the preferred design, the second counterbalancing mass is integrated into the counterbalance cup 54 seen in FIGS. 4, 5 and 6. The counterbalance cup 54 includes a shaft opening 56 that extends completely through the counterbalance cup and defines an axis of rotation 58 for the counterbalance cup. The second counterbalance mass 52 is offset to one side of the axis of rotation 58 and a cup opening 60 that extends only partially through the counterbalance cup has a center 62 (see FIG. 6) that is offset in the opposite direction from the counterbalance mass 52.

As may be seen by comparing FIGS. 3 and 6 to the cross sectional view in FIG. 2, the counterbalance cup 54 slides onto the eccentric shaft 22. Shaft opening 56 matches the diameter of the eccentric shaft in the region 64 while the cup opening 60 is sized to receive and engage the eccentric portion of the shaft 46 in the region marked with reference number 66. Because the center 62 of the cup opening 60 is offset from axis 58, the engagement between the cup opening 60 and the eccentric shaft portion 46 acts to prevent the counterbalance mass 52 from rotating relative to the eccentric shaft 22. The second counterbalance mass 52 always remains on the same side of the shaft 22 as the first counterbalance mass 48, and that side is always opposite the side of the shaft from the eccentric shaft portion 46.

This dual counterbalance design produces an effective dynamic counterbalancing that acts substantially opposite to the masses being driven by the eccentric motion and eliminates the wobbling motion described above. The result is to significantly reduce wear, extend the life of the drive components and increase the time the tool can be used without operator fatigue.

It should be noted that the present invention is directed not only to the dual counterbalance dehider design of FIGS. 1 and 2, but also to the individual drive components for a hand held dehider comprising the eccentric shaft of FIG. 3 with the integrated counterbalance 48 and the counterbalance cup seen in FIGS. 4, 5 and 6 with the integrated counterbalance mass 52.

The design illustrated in FIGS. 1-6 allows the counterbalancing masses 48 and 52 to be extremely close to the plane of the pushrods and the moving masses. As a result any remaining imbalance or imbalance from subsequent wear or manufacturing variation results in a very reduced amplitude wobble as compared to prior art counterbalancing designs with a single counterbalance located far from the plane of the pushrods.

Figure 7:
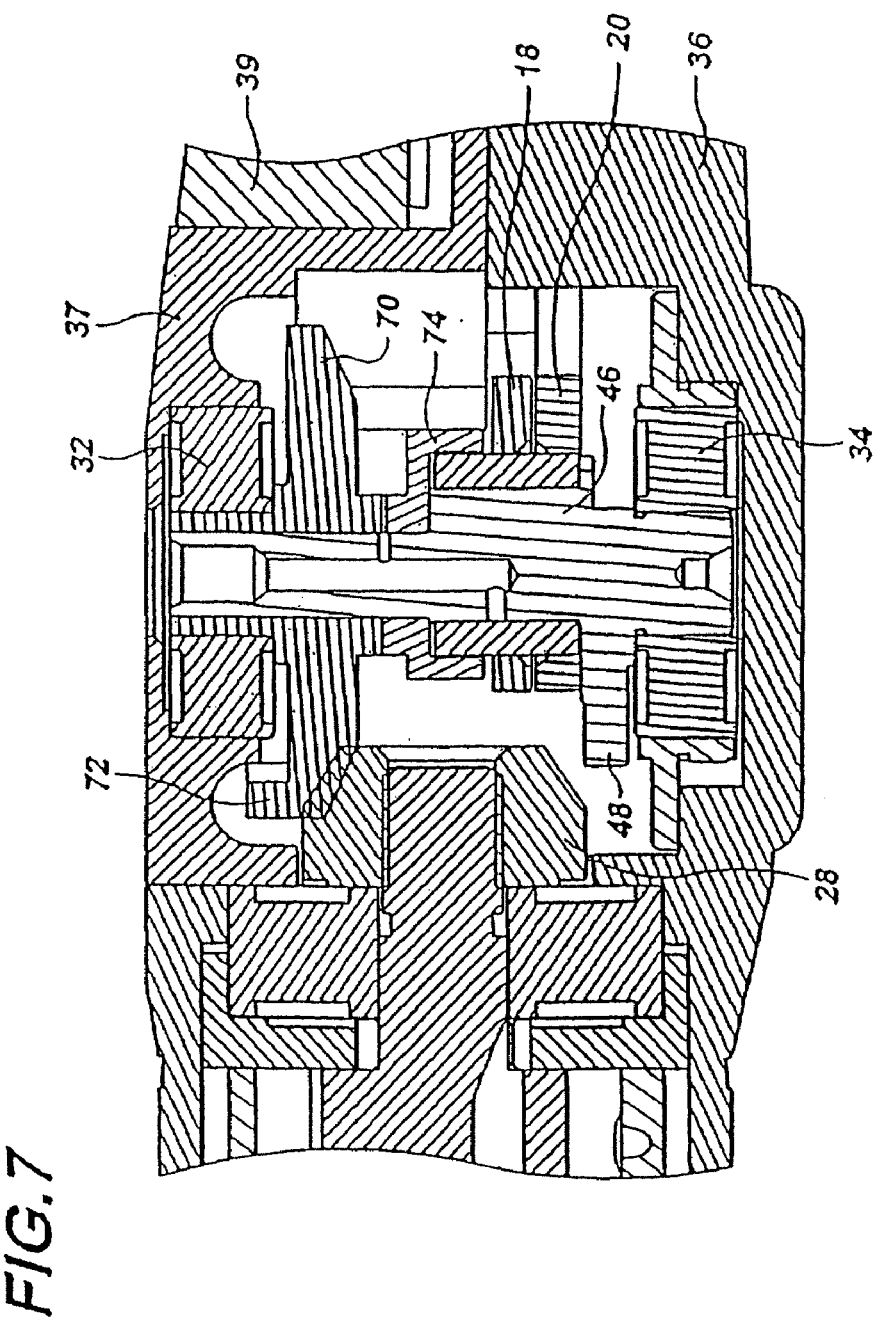
FIG. 7 is a side elevational view, in cross section, of a portion of a second embodiment of a dehider according to the present invention. Only the central portion of the dehider is shown in the vicinity of the drive mechanism and eccentric.

Although the preferred embodiment is seen in FIGS. 1 and 2, an alternative embodiment is seen in FIG. 7 in which one counterbalance remains on the main drive gear, as in the prior art, and a second counterbalance is located on the opposite side of the pushrods on the eccentric shaft. In FIG. 7, only a detailed portion of the drive mechanism is shown. The portion shown substantially corresponds to the central area showing the eccentric shaft 22 in the cross sectional view of FIG. 2.

However, in the design of FIG. 7, the counterbalance cup of FIGS. 4, 5 and 6 is replaced by the prior art counterbalanced main drive gear 70 with an integrated counterbalance mass 72. As can be seen in the enlarged view of FIG. 7, the counterbalance mass 72 is located on one side of the main drive gear 70. The counterbalance cup of FIGS. 4, 5, and 6, which is used in the design of FIGS. 1 and 2, is replaced by a simple spacer cup 74 located between the main drive gear 70 and the eccentric shaft portion 46. The spacer cup has no counterbalance mass.

In all other respects the embodiment in FIG. 7 corresponds to the embodiment in FIG. 1-6. Counterbalance mass 48 on the eccentric shaft is located on the opposite side of the pushrods from the counterbalance mass 72 on the drive gear. As in the design in FIGS. 1-6, these two counterbalance masses cooperate to provide dynamic counterbalancing that acts substantially opposite the eccentric shaft portion 46 in the plane of the pushrod.

Figure 8:
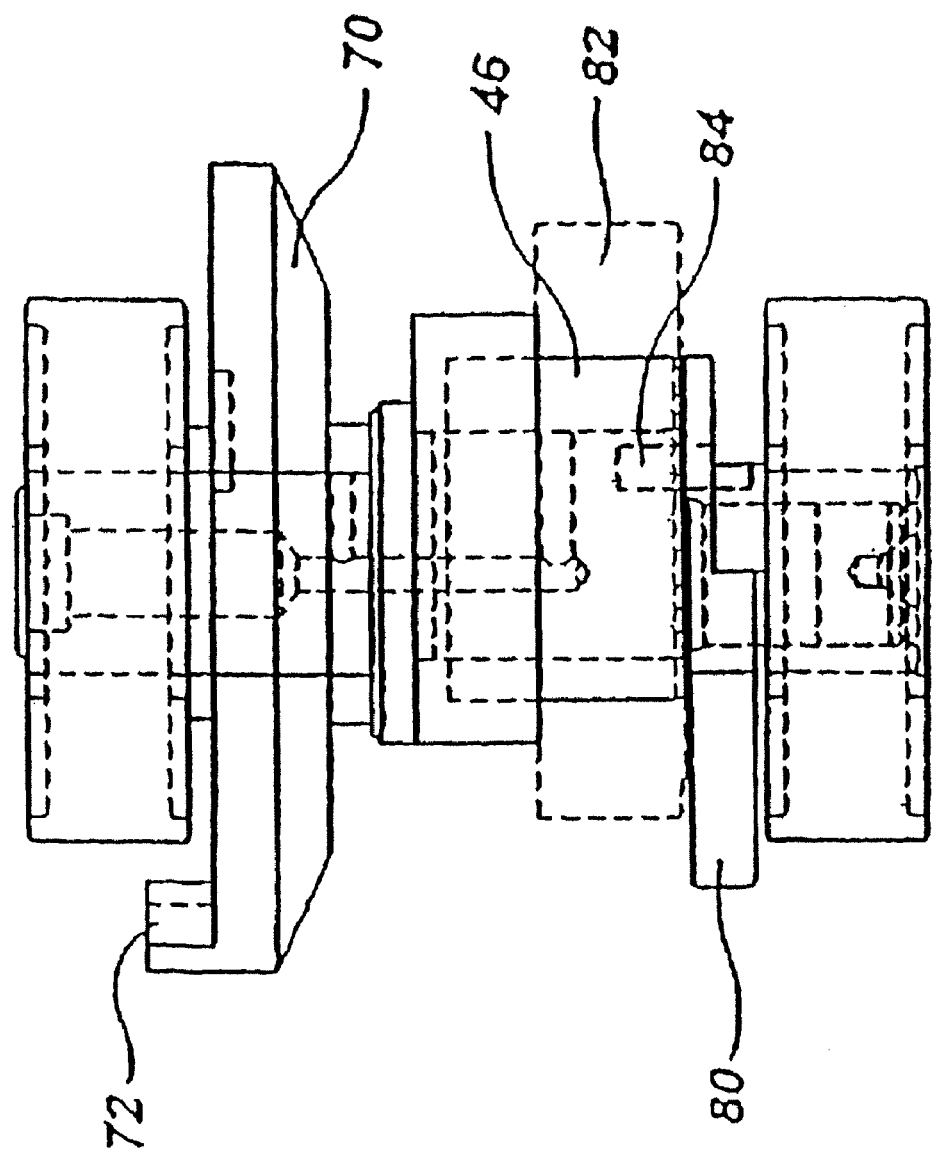
FIG. 8 is a side elevational view of an assembled drive mechanism of a third embodiment of a dehider according to the present invention.

FIG. 8 shows yet another embodiment of the counterbalanced drive mechanism of this invention. In this design, both of the counterbalance masses are entirely separate from the eccentric shaft. The first counterbalance mass 80 is a separate piece located below the eccentric shaft portion 46 where the pushrods are connected (shown in phantom 82). The first counterbalance mass 80 in this design is held in place by a pin 84 to prevent it from rotating around the eccentric shaft. The pin 84 ensures that the first counterbalance mass 80 always remains opposite the offset direction of the eccentric shaft portion 46.

The first counterbalance mass 80 is removable and replaceable by disassembling the drive mechanism of FIG. 8, removing pin 84 and sliding the first counterbalance mass 80 off the end of the eccentric shaft.

The second counterbalance mass 72 is located on the main drive gear, as in the design of FIG. 7, above the eccentric shaft portion 46. The second counterbalance mass 72 is on the opposite side of the rotational axis of the eccentric shaft from the offset eccentric shaft portion 46 and on the same side of that axis as the first counterbalance mass 80.

It will be understood from the various embodiments shown that the first and second counterbalance masses may be formed as part of the eccentric shaft (FIG. 3), as part of the drive gear (FIGS. 7 and 8), or as separate pieces, such as the counterbalance cup (FIGS. 4-6) or the first counterbalance mass 80 (FIG. 8). In each case, one counterbalance mass is located above the plane of the pushrods, and one below that plane so that the vibration due to the eccentrically driven moving mass of the tool is effectively and dynamically counterbalanced.

In addition to the dual counterbalance feature described above, the preferred embodiment of the dehider also includes a speed governor 100 located in the handle 26. The speed governor operates by restricting the flow of pressurized air from the air inlet 102 to the motor 24 when the motor is rotating rapidly and opening up to supply more pressurized air when the motor slows down.

Figure 9:
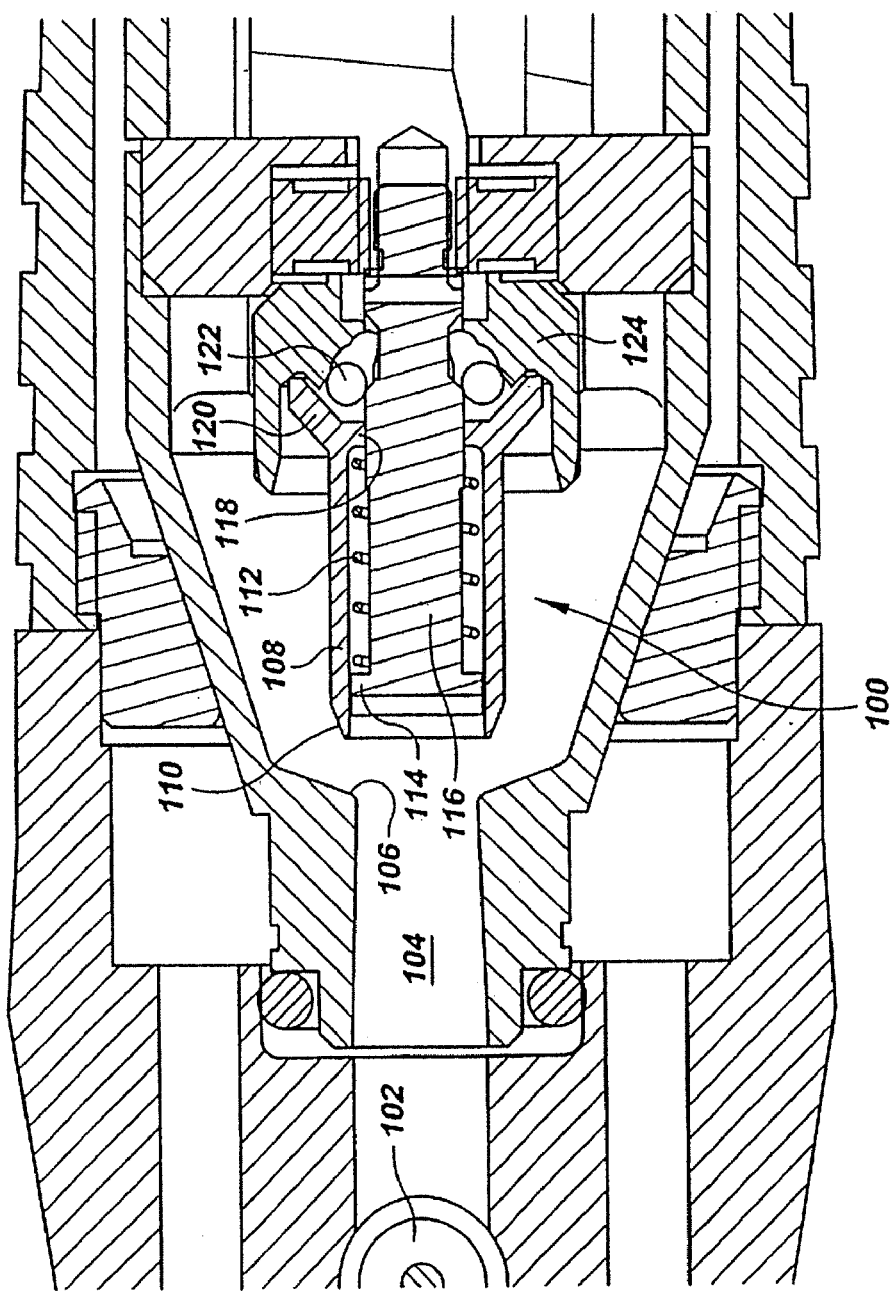
FIG. 9 is a side elevational view, in cross section, of the speed governor portion of the present invention as seen in FIGS. 1 and 2.

Referring to FIG. 9, the design and operation of the speed governor 100 will now be described. Pressurized air from the air inlet 102 flows into air passageway 104. The air passageway 104 includes a valve seat 106. Opposite the valve seat 106 is a valve head 108 that can move towards the valve seat 106. The valve head 108 has a beveled end 110 that acts to restrict airflow through the space between the valve seat 106 and the beveled end 110. Air that passes through the space between the valve seat 106 and the beveled end 110 eventually powers the motor 24.

The valve head 108 is biased to the right, as illustrated in FIG. 9 by governor spring 112. The governor spring 112 surrounds the core 116 and is trapped between an outwardly projecting lip 114 on the core 116 and an inwardly projecting lip 118 on the valve head 108.

The valve head 108 also includes an outwardly angled flange 120 that traps a plurality of governor balls 122 between the angled flange 120, the core 116 and a governor housing 124. The valve head 108, core 116, governor housing 124, governor balls 122 and the governor spring 112 all spin with the motor 24. As the governor balls 122 spin with the motor, centrifugal force attempts to drive them outward and up the angled flange 120 between the angled flange 120 and the governor housing 124.

The governor balls 122 act as a movable mass that operates the governor by centrifugal force. The outward motion of the governor balls applies a force against the angled flange 120 and the valve head 108, which compresses the spring 112 and moves the beveled end 110 of the valve head 108 towards the valve seat 106. The faster the motor spins, the more this valve action restricts the airflow and the less pneumatic power is supplied to the motor.

As the dehider begins to cut and the load on the motor increases, the speed of the motor will drop. This decrease in speed will cause the centrifugal force applied by the governor balls to the valve head 108 to decrease. In turn, the spring 112 will move the valve head 108 away from the valve seat and the valve will open further, allowing more airflow. The result of increased airflow is that the motor will produce more power and will return to the original operating speed even under load.

The governor 100 will control the speed in the manner described under significant variations in operating load. When the motor is above the desired rotational speed, the governor restricts the flow of pressurized air to decrease speed. When the motor is below the desired rotational speed, the governor opens up to increase airflow and increase the motor's speed.

Figure 10:
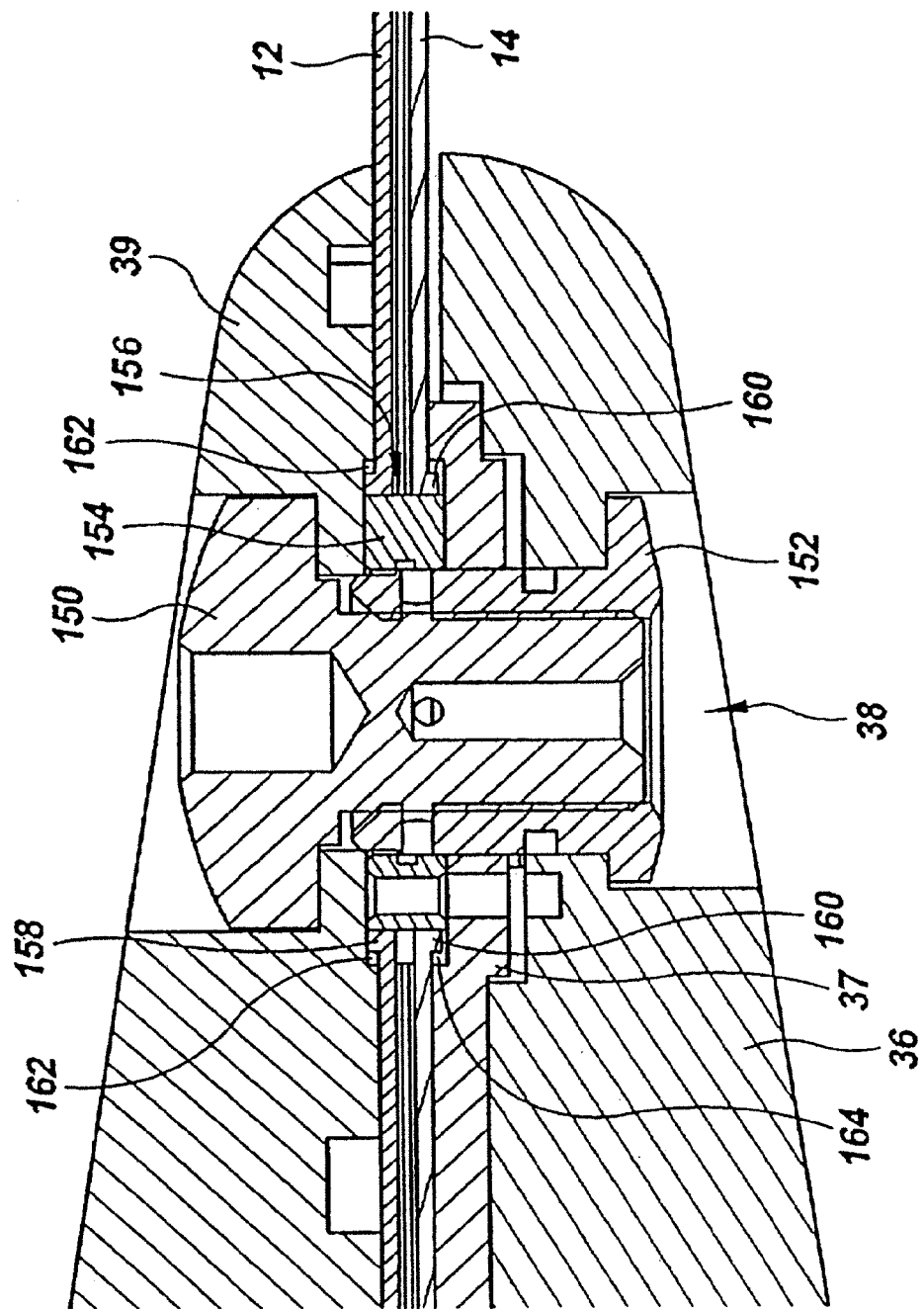
FIG. 10 is a side elevational view, in cross section, of the blade hub portion of the present invention as seen in FIGS. 1 and 2.

The preferred embodiment of the dehider further includes an improved cutting disk design for the cutting disk blades 12 and 14. The cutting disks 12 and 14 turn on central cutting disk shaft 38, which includes an upper bolt 150, a lower nut 152 and a cylindrical collar 154. The collar 154 has an outer surface 156 that acts as the bearing surface the cutting disks 12 and 14 turn on. In current dehider designs, the disk blades are of a constant thickness. However, as can be seen in FIG. 10, the strengthened cutting disks 12, 14 of this dehider have a cylindrical lip (158 on cutting disk 12 and 160 on cutting disk 14) that significantly increases the bearing surface between the cutting disks and the outer bearing surface 156 of the collar 154.

In the preferred design, the cutting disks are produced from material that is thicker than the final thickness of the outer area of the disk, and equal in thickness to the cylindrical bearing lips 158 and 160 at the center of the disk. The disk blades are ground to reduce their thickness everywhere except at the cylindrical bearing lips 158 and 160. Alternatively, however, the bearing lip may be added by a process such as by brazing or welding on additional material, or by deforming a thinner sheet at the inner perimeter to form the lip.

The reduction in thickness of the disk blade in the outer area as compared to the thickness of the cylindrical lip at the center of the disk blade has two principal advantages. The first is that the weight of each cutting disk blade is reduced. This reduces the oscillating mass, which reduces wear and vibration, as well as reducing the total weight of the dehider. The second advantage is that the total thickness of the combined cutting disks 12 and 14 is reduced, which allows the cutting disks to enter the space between the carcass and the hide more easily for hide removal and improves cutting performance as compared to thicker cutting disks.

It will be noted that the cutting disks 12 and 14 are identical except that one is inverted relative to the other. The bearing lips 158, 160 project outward at ninety degrees to the plane of their respective cutting disks. When the cutting disks are inverted and placed in back-to-back contact with each other, as illustrated, the lips 158 and 160 project in opposite directions and do not interfere with each other. The result is a substantial increase in the area of the bearing surface at the center of the tool and a substantial increase in the usable life of the cutting disks.

The upwardly projecting bearing lip 158 on cutting disk 12 is captured inside a corresponding recess 162 in the blade cover 39. The downwardly projecting bearing lip 160 on cutting disk 14 is captured inside a similar cylindrical recess 164 formed in the drive mechanism cover 37. The recesses 162 and 164 also provide clearance for the cylindrical collar 154.

The outward projection of the bearing lips 158 and 160, in combination with the shape of the recesses 162 and 164 also act to prevent contaminants from entering the bearing area between the outer bearing surface of the cylindrical collar 154 and the inner bearing surface formed by the bearing lips 158 and 160 and the central openings of the cutting disks.

Although the bearing lip design described above is most suited for handheld dehiders having oppositely oscillating cutting disk blades, it may also be implemented in dehider designs where a single cutting disk continuously rotates, where a pair of cutting disks continuously rotate in opposite directions or in dehider designs where a single blade oscillates and another blade remains still.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A handheld dehider comprising:
   a pair of cutting disks mounted on a cutting disk shaft;
   a drive mechanism for driving the cutting disks in opposed cutting oscillations including:
      an eccentric shaft, and
      a pair of pushrods, one for each cutting disk, each pushrod being connected between the eccentric shaft and its respective cutting disk;
   a pneumatic motor connected to turn the eccentric shaft and oscillate the pair of pushrods; and
   a housing having the pneumatic motor mounted therein and including an air inlet for providing a flow of pressurized air to the motor; and
   a speed governor connected between the air inlet and the motor, the speed governor automatically controlling the flow of pressurized air from the air inlet to the pneumatic motor to maintain a desired rotational speed for the motor.

2. The handheld dehider according to claim 1 wherein the speed governor is connected to spin with the pneumatic motor and operates by centrifugal force to restrict the flow of pressurized air from the air inlet to the pneumatic motor to decrease the speed of the motor when the motor speed is above the desired rotational speed.

3. The handheld dehider according to claim 1 wherein the speed governor includes a valve head connected to spin with the pneumatic motor and the air inlet is connected to a valve seat, the valve head moving towards the valve seat to restrict the flow of pressurized air from the air inlet to the pneumatic motor and decrease the speed of the motor when the motor speed is above the desired rotational speed.

4. The handheld dehider according to claim 3 wherein the speed governor further includes:
   a governor spring biasing the valve head away from the valve seat; and
   a movable mass connected to spin with the pneumatic motor, the movable mass moving outward as the speed governor spins and compressing the governor spring to move the valve head towards the valve seat and restrict the flow of pressurized air from the air inlet to the pneumatic motor.

5. The handheld dehider according to claim 4 wherein the movable mass comprises a plurality of governor balls.

6. The handheld dehider according to claim 5 wherein the governor balls contact an angled flange on the valve head and exert centrifugal force against the angled flange as the motor spins to compress the governor spring and move the valve head towards the valve seat.

7. The handheld dehider according to claim 1 wherein the housing includes a drive mechanism cover, the drive mechanism cover including a drive mechanism cover portion, a barrier plate portion and wall portion connecting the drive mechanism cover portion to the barrier plate portion.

8. The handheld dehider according to claim 1 wherein drive mechanism cover is made of steel.

9. The handheld dehider according to claim 1 wherein each cutting disk includes a central opening and a bearing lip surrounding the central opening, the central openings and bearing lips of the pair of cutting disks forming a bearing surrounding the cutting disk shaft.

10. The handheld dehider according to claim 1 wherein:
   the cutting disk shaft includes a cylindrical collar having an outer bearing surface; and
   each cutting disk includes a central opening and a bearing lip surrounding the central opening, the central openings and bearing lips of the pair of cutting disks forming a bearing having an inner bearing surface, the central openings and bearing lips of the pair of cutting disks surrounding the cylindrical collar and the inner bearing surface contacting the outer bearing surface of the cylindrical collar.

11. The handheld dehider according to claim 10 wherein the speed governor includes a valve head connected to spin with the pneumatic motor and the air inlet is connected to a valve seat, the valve head moving towards the valve seat to restrict the flow of pressurized air from the air inlet to the pneumatic motor and decrease the speed of the motor when the motor speed is above the desired rotational speed.

12. The handheld dehider according to claim 1 wherein the housing further includes:
   a first cover adjacent a first one of the pair of cutting disks, the first cover having a recess for receiving the bearing lip of the first one of the pair of cutting disks; and
   a second cover adjacent a second one of the pair of cutting disks, the second cover having another recess for receiving the bearing lip of the second one of the pair of cutting disks.

13. The handheld dehider according to claim 12 wherein the cutting disk shaft further includes a cylindrical collar and the recesses in the first and second covers also receive the cylindrical collar therein.

14. A handheld dehider comprising:
   a housing;
   a drive mechanism in the housing including an eccentric shaft, and
   a pair of pushrods connected to the eccentric shaft;
   a motor in the housing connected to turn the eccentric shaft and oscillate the pair of push rods;
   a cutting disk shaft; and
   a pair of cutting disks mounted for oscillating rotary motion on the cutting disk shaft, the cutting disks being driven by the pushrods in opposed cutting oscillations and each cutting disk having a central opening and a bearing lip surrounding the central opening, the central opening and bearing lip forming a bearing surrounding the cutting disk shaft,
   the handheld dehider further includes a speed governor, the speed governor operates by centrifugal force.

15. The handheld dehider according to claim 14 wherein the bearing lip surrounding the central opening of each cutting disk projects outwardly from one side of the cutting disk.

16. The handheld dehider according to claim 14 wherein:
   first and second cutting disks forming the pair of cutting disks are mounted on the cutting disk shaft in reversed orientations;
   the bearing lip surrounding the central opening of the first cutting disk projects outwardly from the first cutting disk in a first direction;
   the bearing lip surrounding the central opening of the second cutting disk projects outwardly from the second cutting disk in a second direction; and
   the first and second directions are opposite directions.

17. The handheld dehider according to claim 14 wherein:
   the cutting disk shaft includes a cylindrical collar having an outer bearing surface; and
each cutting disk includes a central opening and a bearing lip surrounding the central opening, the central openings and bearing lips of the pair of cutting disks forming a bearing having an inner bearing surface, the central openings and bearing lips of the pair of cutting disks surrounding the cylindrical collar and the inner bearing surface contacting the outer bearing surface of the cylindrical collar.

18. The handheld dehider according to claim 14 wherein the housing further includes:
   a first cover adjacent a first one of the pair of cutting disks, the first cover having a recess for receiving the bearing lip of the first one of the pair of cutting disks; and
   a second cover adjacent a second one of the pair of cutting disks, the second cover having another recess for receiving the bearing lip of the second one of the pair of cutting disks.

19. The handheld dehider according to claim 18 wherein the cutting disk shaft further includes a cylindrical collar and the recesses in the first and second covers also receive the cylindrical collar therein.

* * * * *

(12) EX PARTE REEXAMINATION CERTIFICATE (8609th)
United States Patent
Gwyther

(10) Number: US 7,722,448 C1
(45) Certificate Issued: Oct. 4, 2011

(54) DEHIDER WITH GOVERNOR AND STRENGTHENED BLADE

(75) Inventor: Peter Gwyther, Madison, CT (US)

(73) Assignee: Jarvis Products Corporation, Middletown, CT (US)

Reexamination Request:
No. 90/009,818, Aug. 26, 2010

Reexamination Certificate for:
Patent No.: 7,722,448
Issued: May 25, 2010
Appl. No.: 11/464,991
Filed: Aug. 16, 2006

(51) Int. Cl.
*A22B 5/16* (2006.01)

(52) U.S. Cl. ............................................. 452/133
(58) Field of Classification Search ............ 452/133
See application file for complete search history.

(56) References Cited

U.S. PATENT DOCUMENTS

| | | |
|---|---|---|
| 3,054,389 A | 9/1962 | Roggenburk |
| 3,740,174 A | 6/1973 | Amtsberg |
| 4,465,443 A | 8/1984 | Kardén |
| 4,797,074 A | 1/1989 | Albert |
| 4,901,400 A | 2/1990 | Karubian |
| 5,122,092 A | 6/1992 | Abdul |
| 7,677,863 B2 | 3/2010 | Jansson |

FOREIGN PATENT DOCUMENTS

WO  WO 2005/105370 A1  11/2005

*Primary Examiner*—Jimmy G Foster

(57) ABSTRACT

A dehider includes a pneumatic motor driving a pair of disk blades in opposed cutting oscillations and a governor that controls the speed of the motor. Governor balls, acting as centrifugal weights, spin with the motor and push against an inclined flange on a valve head to move the valve head towards a valve seat. The motion of the valve head compresses a biasing spring and restricts the flow of pressurized air, as the desired speed is exceeded. As speed decreases, centrifugal force decreases and the biasing spring opens the valve to provide additional power to the motor. The disk blades are provided with a cylindrical central lip that substantially increases the area of the central bearing that the blades turn on and produces significantly longer blade life.

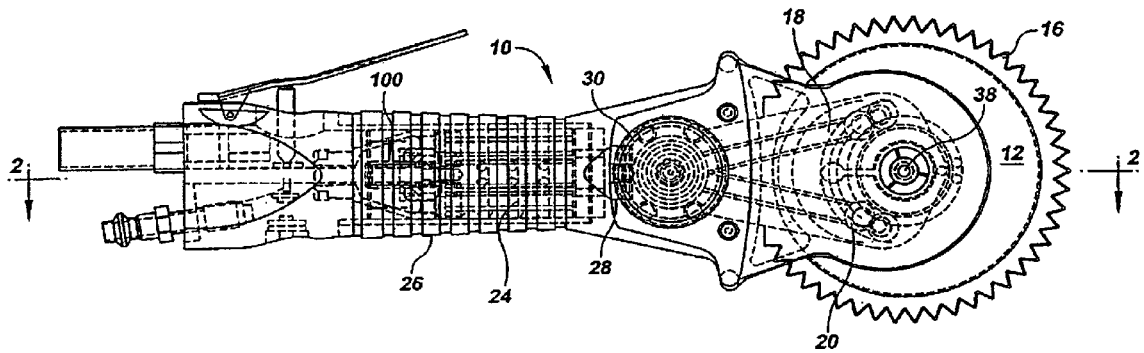

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

Claims 9-19 were not reexamined.

\* \* \* \* \*

(12) EX PARTE REEXAMINATION CERTIFICATE (10312th)
United States Patent
Gwyther

(10) Number: US 7,722,448 C2
(45) Certificate Issued: Oct. 7, 2014

(54) DEHIDER WITH GOVERNOR AND STRENGTHENED BLADE

(75) Inventor: Peter Gwyther, Madison, CT (US)

(73) Assignee: Jarvis Products Corporation, Middletown, CT (US)

Reexamination Request:
No. 90/020,006, Jun. 4, 2012

Reexamination Certificate for:
Patent No.: 7,722,448
Issued: May 25, 2010
Appl. No.: 11/464,991
Filed: Aug. 16, 2006

Reexamination Certificate C1 7,722,448 issued Oct. 4, 2011

(51) Int. Cl.
*A22B 5/16* (2006.01)

(52) U.S. Cl.
USPC .......................................................... 452/133

(58) Field of Classification Search
None
See application file for complete search history.

(56) References Cited

To view the complete listing of prior art documents cited during the proceeding for Reexamination Control Number 90/020,006, please refer to the USPTO's public Patent Application Information Retrieval (PAIR) system under the Display References tab.

*Primary Examiner* — Robert M. Fetsuga

(57) ABSTRACT

A dehider includes a pneumatic motor driving a pair of disk blades in opposed cutting oscillations and a governor that controls the speed of the motor. Governor balls, acting as centrifugal weights, spin with the motor and push against an inclined flange on a valve head to move the valve head towards a valve seat. The motion of the valve head compresses a biasing spring and restricts the flow of pressurized air, as the desired speed is exceeded. As speed decreases, centrifugal force decreases and the biasing spring opens the valve to provide additional power to the motor. The disk blades are provided with a cylindrical central lip that substantially increases the area of the central bearing that the blades turn on and produces significantly longer blade life.

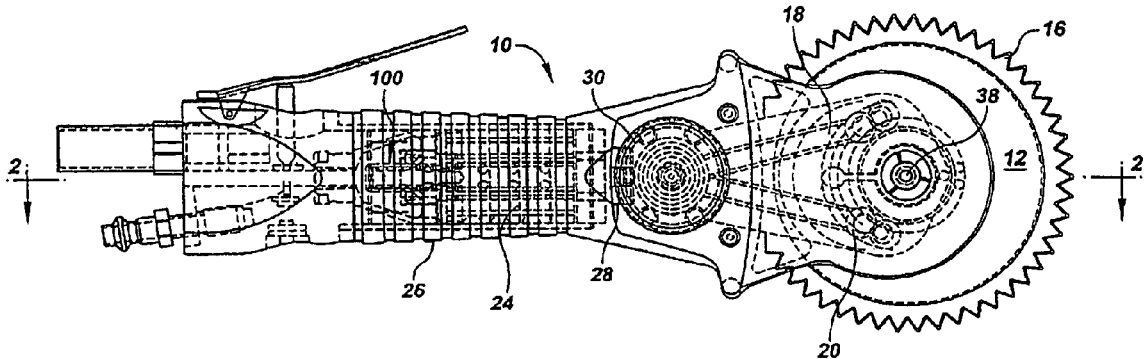

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

New claims 20-23 are added and determined to be patentable.

Claims 9-19 were not reexamined.

20. *The handheld dehider according to claim 1 wherein:*
*the speed governor includes a controllable valve connected between the air inlet and the pneumatic motor; and*
*the controllable valve moves between more and less restrictive positions to control the flow of air from the air inlet to the pneumatic motor and thereby control the rotational speed of the motor;*
*the controllable valve moves towards the less restrictive position to increase the flow of pressurized air from the air inlet to the pneumatic motor responsive to a decrease in air pressure at the air inlet when such decrease in air pressure reduces the rotational speed of the motor below the desired rotational speed for the motor;*
*the controllable valve moves towards the more restrictive position to decrease the flow of pressurized air from the air inlet to the pneumatic motor responsive to an increase in air pressure at the air inlet when such increase in air pressure increases the rotational speed of the motor above the desired rotational speed for the motor;*
*the controllable valve moves towards the less restrictive position to increase the flow of pressurized air from the air inlet to the pneumatic motor responsive to an increase in load on the cutting disks when such increased load reduces the rotational speed of the motor below the desired rotational speed for the motor; and*
*the controllable valve moves towards the more restrictive position to decrease the flow of pressurized air from the air inlet to the pneumatic motor responsive to a decrease in load on the cutting disks when such decreased load increases the rotational speed of the motor above the desired rotational speed for the motor.*

21. *The handheld dehider according to claim 1 wherein:*
*the pneumatic motor rotates about a motor axis;*
*the eccentric shaft and the cutting disk shaft are oriented at ninety degrees to the motor axis and are subject to vibration; and*
*the speed governor includes a controllable valve that moves in the direction of the motor axis, ninety degrees to the eccentric shaft and the cutting disk shaft, between more and less restrictive positions to control the flow of air from the air inlet to the pneumatic motor and thereby control the rotational speed of the motor and reduce vibration.*

22. *The handheld dehider according to claim 1 wherein:*
*the pneumatic motor rotates about a motor axis;*
*the eccentric shaft and the cutting disk shaft are oriented at ninety degrees to the motor axis and are subject to vibration; and*
*the speed governor includes a controllable valve connected between the air inlet and the pneumatic motor, the controllable valve moving between more and less restrictive positions to control the flow of air from the air inlet to the pneumatic motor and thereby control the rotational speed of the motor, and further wherein:*
*the controllable valve moves towards the less restrictive position to increase the flow of pressurized air from the air inlet to the pneumatic motor responsive to a decrease in air pressure at the air inlet when such decrease in air pressure reduces the rotational speed of the motor below the desired rotational speed for the motor;*
*the controllable valve moves towards the more restrictive position to decrease the flow of pressurized air from the air inlet to the pneumatic motor responsive to an increase in air pressure at the air inlet when such increase in air pressure increases the rotational speed of the motor above the desired rotational speed for the motor;*
*the controllable valve moves towards the less restrictive position to increase the flow of pressurized air from the air inlet to the pneumatic motor responsive to an increase in load on the cutting disks when such increased load reduces the rotational speed of the motor below the desired rotational speed for the motor; and*
*the controllable valve moves towards the more restrictive position to decrease the flow of pressurized air from the air inlet to the pneumatic motor responsive to a decrease in load on the cutting disks when such decreased load increases the rotational speed of the motor above the desired rotational speed for the motor.*

23. *A handheld pneumatic dehider having reduced vibration by automatically controlling oscillation rate of oscillating components and rotational speed of rotating components driving the oscillating components, the handheld dehider comprising:*
*a pair of adjacent toothed cutting disks mounted on a cutting disk shaft for movement in opposed rotational cutting oscillations within an oscillation plane, the cutting disk shaft defining a first rotation axis oriented ninety degrees to the oscillation plane about which the cutting disks oscillate in the opposed rotational cutting oscillations;*
*a housing including an air inlet for providing a flow of pressurized air; and*
*a drive mechanism for driving the cutting disks in the opposed rotational cutting oscillations, the drive mechanism including:*
*an eccentric shaft defining a second rotation axis oriented parallel to the first rotation axis of the cutting disk shaft, the eccentric shaft rotating about the second rotation axis in a unidirectional rotary motion;*
*a pair of pushrods, one for each cutting disk:*
*each pushrod having a first end and a second end;*
*the first end of each pushrod being connected to the eccentric shaft and the second end of each pushrod being connected to a respective one of the cutting disks;*
*the second end of each pushrod being connected to its respective cutting disk on an opposite side of the cutting disk shaft from the second end of the other pushrod;* the pushrods moving parallel to the oscillation plane;
the first end of each pushrod being driven rotationally about the second rotation axis by the unidirectional rotary motion of the eccentric shaft;
the second ends of the pushrods moving in linear reciprocating and oscillating motion on opposite sides of the first rotation axis, the pushrod motion in the oscillation plane acting to convert unidirectional rotary motion of the eccentric shaft about the first rotation axis into opposed oscillations of the cutting disks about the second rotation axis and thereby produce the opposed cutting oscillations of the cutting disks in the oscillation plane;
a pneumatic motor mounted within the housing and rotating about a motor axis, the motor axis defining a third rotation axis oriented parallel to the oscillation plane, the third rotation axis being oriented at ninety degrees to the first and second rotation axes defined by the eccentric shaft and the cutting disk shaft, the pneumatic motor being connected to turn the eccentric shaft and oscillate the pair of pushrods parallel to the oscillation plane to produce the opposed cutting oscillations of the cutting disks; and
a speed governor connected to rotate with the motor, the speed governor including a controllable valve connected between the air inlet and the pneumatic motor, and the speed governor acting to reduce vibration in the oscillation plane due to oscillating linear motion of the pushrods moving in the oscillation plane and vibration due to opposed oscillating rotational motion of the cutting disks moving in the oscillation plane by automatically controlling the rotational speed of the pneumatic motor to maintain a desired rotational speed, wherein:
the controllable valve moving in the direction of the motor axis, parallel to the oscillation plane and ninety degrees to the first and second rotation axes, between more and less restrictive positions to control the flow of pressurized air from the air inlet to the pneumatic motor and thereby automatically control the rotational speed of the motor to maintain the desired rotational speed and reduce vibration in the oscillation plane, the speed governor including:

at least one movable centrifugal mass located within the speed governor, the centrifugal mass rotating about the motor axis; and
a biasing spring biasing the speed governor to increase the flow of pressurized air from the air inlet to the pneumatic motor;
the centrifugal mass moving under applied centrifugal force away from the third rotation axis of the motor as the speed governor increases speed to restrict the flow of pressurized air from the air inlet to the pneumatic motor and reduce vibration in the oscillation plane produced by the oscillating pushrods and opposed oscillating cutting disks when the motor speed is above the desired rotational speed;
and further wherein:
the controllable valve of the speed governor moves towards the less restrictive position to increase the flow of pressurized air from the air inlet to the pneumatic motor responsive to a decrease in air pressure at
the air inlet when such decrease in air pressure reduces the rotational speed of the motor below the desired rotational speed for the motor;
the controllable valve of the speed governor moves towards the more restrictive position to decrease the flow of pressurized air from the air inlet to the pneumatic motor responsive to an increase in air pressure at the air inlet when such increase in air pressure increases the rotational speed of the motor above the desired rotational speed for the motor;
the controllable valve of the speed governor moves towards the less restrictive position to increase the flow of pressurized air from the air inlet to the pneumatic motor responsive to an increase in load on the cutting disks when such increased load reduces the rotational speed of the motor below the desired rotational speed for the motor; and
the controllable valve of the speed governor moves towards a more restrictive position to decrease the flow of pressurized air from the air inlet to the pneumatic motor responsive to a decrease in load on the cutting disks when such decreased load increases the rotational speed of the motor above the desired rotational speed for the motor.

\* \* \* \* \*